July 2, 1940.   H. BLECHNER   2,206,626
AUTOMATIC REGULATION OF EXPOSURE IN PHOTOGRAPHIC APPARATUS
Filed Feb. 10, 1939
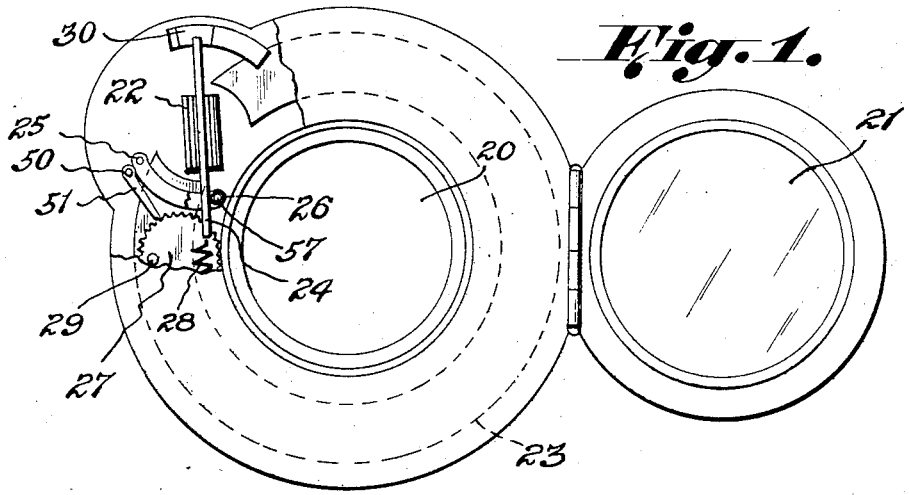
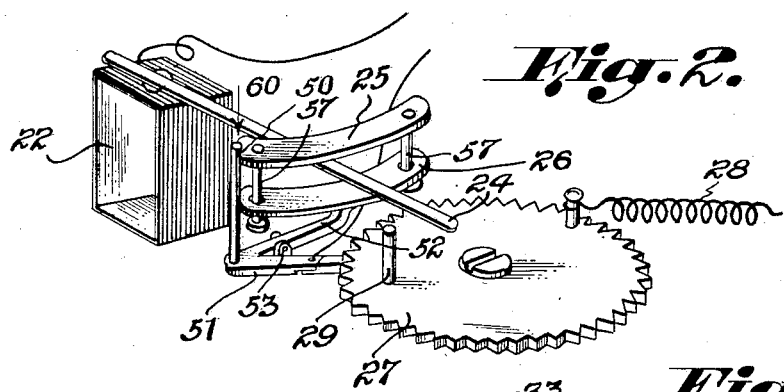
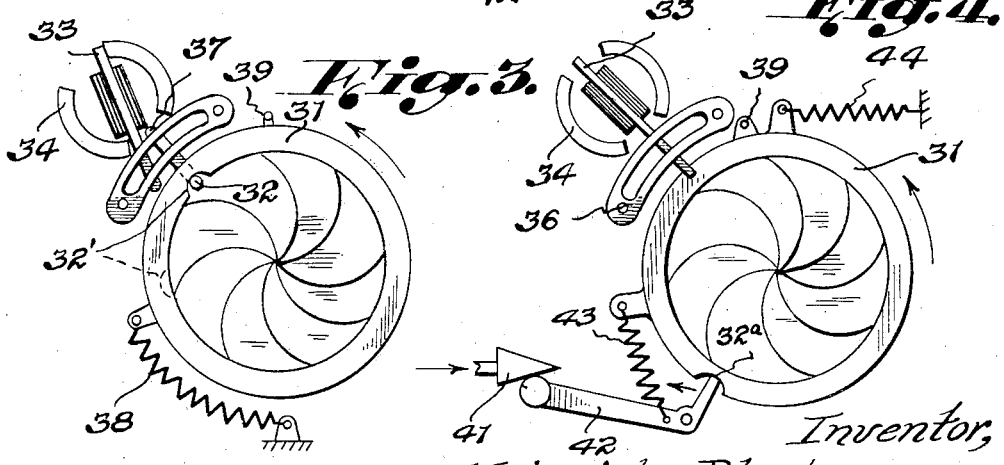
Inventor,
Heinrich Blechner Patented July 2, 1940

2,206,626

UNITED STATES PATENT OFFICE 2,206,626

AUTOMATIC REGULATION OF EXPOSURE IN PHOTOGRAPHIC APPARATUS

Heinrich Blechner, Vienna, Germany

Application February 10, 1939, Serial No. 255,750
In Austria February 28, 1935

5 Claims. (Cl. 95—53)

This application is a continuation-in-part of my copending application Serial No. 31,746, filed July 16, 1935.

This invention relates to the automatic regulation of exposure in photographic apparatus including cinematographic and copying apparatus by automatically controlling a regulating member (such as shutter or diaphragm) on which the extent of the exposure of the sensitized surface wholly or partly depends, by means of electric exposure meters, that is to say, electric or electromagnetic devices actuated by photoelectric cells or the like.

In the description of the invention the regulating member controlled by photoelectric means will be referred to as the "dependent regulating member," while that which is adjustable at will by the person operating the photographic apparatus or the like, and which is thus independent of the action of light on the photoelectric cell or the like, will be designated the "independent regulating member." If for example the timing of the exposure, that is to say the adjustment of the working speed of the shutter, be left to the operator to effect, then the shutter is the independent regulating member, and the adjustment of the diaphragm (as being the dependent regulating member) suitable to this length of exposure in view of the lighting conditions prevailing at the time is effected automatically by the photoelectric cell. If the setting of the diaphragm be left to the operator then the diaphragm is the independent regulating member, and the timing of the exposure, that is to say, the setting of the shutter (as being the dependent regulating member) to suit the stop used in view of the lighting conditions prevailing at the time, is effected automatically by the photoelectric cell.

Broadly, the invention consists in arranging that even the weak currents or voltages available in the circuits of photoelectric cells or the like, and more particularly of the so-called photo-elements such as the barrier layer cells which act without auxiliary batteries or the like, with the light intensities to be coped with, may be capable of effecting the required adjusting operations automatically and with the necessary accuracy and reliability, even if these operations themselves would require the expenditure of relatively considerable energy. This result is achieved in accordance with the invention by so constructing and arranging the member (indicating member) moved by the exposure meter according to the light intensity at the time that this member, when in its operative position, offers a firm, mechanical abutment or stop for an element which pertains to the exposure regulating member (dependent regulating member), and which determines the setting of this latter member, while the moving of the dependent regulating member up to the fixed stop is effected by means of any suitable source of power of the required strength.

At the same time the various adjustments of independent exposure regulating members, and alterations in other factors determining the exposure, such as the degree of sensitiveness of the sensitized surface used, can be suitably taken into account or allowed for, for example by adjustment of the electric device or the like actuated by the photoelectric cell or the like.

In the accompanying drawing, the invention is illustrated by several constructional examples.

In Figs. 1 and 2, a simple form of construction embodying the invention is shown quite diagrammatically, in which the shutter of a photographic camera or the like is the dependent regulating member.

Figs. 3 and 4 show arrangements for controlling the opening of a diaphragm of a photographic camera according to the brightness of the object to be photographed.

Fig. 1 is a front elevation of the camera or the like with the lens cover hinged open; Fig. 2 shows details of the exposure meter, that is to say of the device actuated by the photo-electric cell or the like, it being the indicating member of this device which constitutes a non-yielding stop for an element which pertains to the shutter of the camera, and by which the setting of the shutter is determined.

The indicating member is in the form of a pointer 24 which is coupled with the moving coil 22 of a moving coil instrument of which the magnet 23 encircles the lens 20, and which is actuated by the current from the photo-element 21 housed in the lens cover. The pointer 24 assumes a certain operative position corresponding to the intensity of the light to which the photoelectric cell is exposed, in which position it limits the movement of an element 29 (pin, stud, lever, or the like) pertaining to the shutter, whereby the working of the shutter is regulated according to the light conditions prevailing at the moment the exposure is made, either by means of a pre-tensioned spring or by the tensioning of a spring simultaneously with the exposure.

In this form of construction of the invention the indicating member, in order to afford a firm abutment, is held fast in its operative position by means of clamping cheeks 25 and 26 which are pressed together by means actuated at the moment the releasing or tripping device of the shutter is operated.

When the photoelectric cell, which is hinged like the back of a watch, is swung open light from the object to be photographed falls on this cell. The resulting photo-electric current rotates the moving coil 22 and with it the pointer 24. On actuation of the releasing member 50, in direction of the arrow 60, of the shutter the pre-tensioned spring 28 or the shutter is released, for example, by moving a ratchet-lever 51 which is connected with the releasing member 50 out of engagement with the teeth of the tooth-wheel or gear sector 27 pertaining to the working mechanism of the shutter. At the same time the clamping jaws or cheeks are closed, the lower clamping jaw 26, for example, being raised on the pins 57 into its clamping position by a lever 52 or the like pivoted in a locally fixed bearing 53, which lever is also connected with the releasing member 50 of the shutter. Thereby the pointer 24 is held fast by the clamping jaws or plates in the position occupied at the moment of exposure, and thus constitutes the firm stop against which the pin 29 of the tooth wheel 27 abuts in the motion thereof under the action of the spring 28, with the result that according to the setting of the pointer and the position of the stop a longer or shorter exposure is obtained; since, according to the length of the path which the pin 29 has to make up to the stop during the running of the shutter ("Compur-shutters" and the like), the speed of the shutter or the time of exposure is determined.

The manner in which the time of exposure is determined by the path of the pin 29 is very well known in Patent No. 1,941,292 and forms no object of the invention.

In order to take account in a simple and straight-forward manner of the fact that the exposure has to be greater in poor light and less in bright light than would be proportionate to the actual intensity of the light, that is to say in order to allow for correction of the diaphragm setting in a convenient manner provision is further made for a second arm of the pointer 24 to play over the scale of a suitable correction dial 30 which indicates when such correction according to prevailing light conditions should be made.

In the form of construction of the invention shown in Figs. 3 and 4, the diaphragm is the dependent regulating member for controlling the exposure in photographic apparatus, cinematographic apparatus, copying apparatus, and the like.

Figs. 3 and 4 show an arrangement for controlling the opening of the diaphragm of a photographic camera according to the brightness of the object to be photographed. For instance in the case of cinematographic camera the pictures are taken usually at the same speed and thus with the same time of exposure, while the changing brightness of the object to be photographed is controlled by the adjustment of the diaphragm.

The diaphragm shown in Fig. 3 is secured in the open or closed position by the diaphragm-ring 31, which is under the influence of a tensioning spring 38 and is fixed by a disengageable stop 32, co-operating with a recess 32' of the diaphragm-ring. At the moment of disengagement of the stop, the pointer 33 of the measuring instrument 34 indicating the photo-current is clamped by the jaws 36 in that a wedge 37 connected with the stop 32 is pressed below the bottom jaw to effect the clamping action. When further depressing the stop, the diaphragm-ring 31 is turned in a counter-clockwise direction by the action of the spring 38 until an extension 39 of said ring strikes against the clamped pointer.

If it is desired to vary the adjustment of the diaphragm, the diaphragm-ring 31 is turned in a clockwise direction, whereby the inclined face of the wedge 37 becomes inoperative, so that the jaws release the pointer and the spring 38 is placed in tension at the same time. Now the stop 32 again engages the ring 31 and secures the same in the initial position. The return movement of the diaphragm and the release of the measuring pointer 33 can be performed manually or in a mechanical or electromagnetic manner, for instance in the case of copying apparatus, by arranging recesses on the film by means of any known arrangement.

Further the diaphragm may be operated by subjecting the diaphragm-ring not to the permanent tension of a spring but by operating the releasing device shown in Fig. 4 and thereby placing in tension a spring 43, which is disengaged by depressing a push-button to a greater extent.

Particularly in the case of kinematographic cameras it is desirable to adjust the diaphragm simultaneously with the disengagement of the film feed device. For this purpose, the arrangement shown in Fig. 4 is such that the disengaging arrangement of the film feed device shifts a wedge 41, which also operates the jaws 36 and rocks an angle lever 42 which has the tendency to turn the diaphragm-ring 41 by the aid of a spring 43. However the rotation takes place only until the other arm of the angle lever, corresponding to the stop 32, leaves the recess 32a of the diaphragm-ring 31. The diaphragm is returned into the initial position by a spring 44, which is placed in tension when opening the diaphragm and is secured to the diaphragm-ring.

The instrument 34 is mounted to be rotatable and can be turned either by hand or by means of a Bowden cable and the pointer receives an additional adjustment independent from the photo-current, in order to adapt the effect of the arrangement to the different sensitivenesses of the photographic material or to positively vary the diaphragm-opening, controlled by the photo-current. The degrees of rotation may be indicated on a dial designed for instance according to the sensibility of the layer. The instrument 34 together with the clamping jaws may be arranged remote from the diaphragm and the movement of the diaphragm-ring 31 may be in connection with a stop, cooperating with the pointer 33 by means of a Bowden cable.

This construction is useful not only for film apparatus with intermittently or continuously fed filmband but also for instance for aircraft cameras or for cameras for taking panoramic views at different times. In these apparatus the diaphragm is adjusted in accordance with the frequency of photographing by any known disengaging device.

What I claim is:

1. An arrangement for the automatic regulation of exposure in photographic apparatus and the like comprising in combination, a photoelectric cell for generating an electric current in accordance with the intensity of light prevailing at the time of exposure, an electrical measuring instrument adapted to be actuated by said current and provided with a pointer moved in accordance with said current, clamping means for holding said pointer in its deflected position determined by the current in said measuring instrument, a photographic shutter mechanism for regulating the time of exposure having a movable timing element lying in the path of the moving pointer and moved on operation of the shutter until being stopped by the fixed pointer, the time of opening of said shutter being a function of the extent of the movement of said element, and operable means for releasing the shutter mechanism, said releasing means being mechanically connected with means for actuating said clamping means.

2. An arrangement as claimed in claim 1, wherein said releasing means are mechanically connected by suitable means with said clamping means for first operating said clamping means and subsequently said shutter mechanism.

3. An arrangement as claimed in claim 1, including means for correspondingly displacing the stopping point for the timing element of the shutter when one of the other of the exposure influencing members of the apparatus is altered.

4. An arrangement as claimed in claim 1, wherein a correction dial is provided and the pointer is provided with an arm so arranged as to play over the correction dial to indicate an occasional correction for the setting of a regulating member of the photographic apparatus other than the shutter.

5. An arrangement as claimed in claim 1, wherein said electrical measuring instrument is rotatably arranged with respect to the releasing means for cooperating with said rotatable instrument for correspondingly displacing the stopping point for the timing element of the shutter when one of the other of the exposure influencing members of the apparatus is altered.

HEINRICH BLECHNER.